United States Patent [19]
Muto et al.

[11] Patent Number: 5,191,568
[45] Date of Patent: Mar. 2, 1993

[54] DISC DRIVE APPARATUS WITH TRACKING CONTROL BASED ON MULTIPLE REFERENCE TRACKS AND WITH AUTOMATIC SEEK TIME ADJUSTMENT

[75] Inventors: Takayasu Muto; Mamoru Osato; Junkichi Sugita; Masami Kashiwagi; Toru Tanaka, all of Kanagawa; Hidekazu Seto, Tokyo, all of Japan

[73] Assignee: Sony Corporation, Tokyo, Japan

[21] Appl. No.: 628,475

[22] Filed: Dec. 17, 1990

[30] Foreign Application Priority Data

Dec. 18, 1989 [JP] Japan .................................. 1-326054
Dec. 27, 1989 [JP] Japan .................................. 1-336528

[51] Int. Cl.$^5$ ......................... G11B 7/00; G11B 5/596
[52] U.S. Cl. .................................. 369/32; 369/44.26; 369/44.29; 360/78.06
[58] Field of Search .................. 369/32, 44.26, 275.3, 369/44.35, 48, 44.27, 44.28, 44.29, 54, 44.34, 44.36; 360/77.06, 78.06, 78.08

[56] References Cited

U.S. PATENT DOCUMENTS

4,502,082  2/1985  Ragle et al. ................... 360/77.06
4,797,752  1/1989  Giddings ....................... 369/275.3
5,050,146  9/1991  Richgels et al. ................... 369/32

*Primary Examiner*—Andrew L. Sniezek
*Assistant Examiner*—Nabil Hindi
*Attorney, Agent, or Firm*—Philip M. Shaw, Jr.

[57] ABSTRACT

The present invention provides a disc drive apparatus having an improved tracking control and seek time adjustment. The head tracking error distribution along the disc radius is determined with reference to the phases of a plurality of position sensors and is calculated based on the tracking error of a reference track in first and second reference regions with respect to the signal from one of the position sensors. This information is used to determine the tracking error distribution along the disc radius with respect to that one of the position sensors. The tracking error distribution is used to determine the tracking error of a reference track in a third reference region with respect to the signal from the same position sensor. This tracking error is used to determine the tracking error of other reference tracks in the third reference region with respect to the signals from other of the position sensors. The tracking error of the reference tracks is then used to determine the tracking error of the data tracks on the disc. The present invention also provides a disc drive apparatus having an automatic seek time adjustment. A predetermined number of tracks is moved through based on a set head velocity. The seek time is compared to a prescribed seek time. If the two times differ, the velocity is adjusted until the prescribed seek time is achieved.

4 Claims, 5 Drawing Sheets

DISC DRIVE APPARATUS WITH TRACKING CONTROL BASED ON MULTIPLE REFERENCE TRACKS AND WITH AUTOMATIC SEEK TIME ADJUSTMENT

BACKGROUND OF THE INVENTION

1. Field of the Invention

This invention relates to a disc drive apparatus and, more particularly, to improvement in the tracking control function of the disc drive apparatus and to automation of seek time adjustment.

2. Prior Art

With the conventional disc drive apparatus, the magnetic disc or disc medium is driven into rotation by a spindle motor, and a data-recording tracks or data tracks are formed concentrically or spirally on the recording layer of the magnetic disc surface. The following methods have been known and used for forming the data tracks on the magnetic disc.

For example, for forming the data tracks on the magnetic disc surface, there are formed servo tracks, each having a servo pattern, referred to as a tri-bit servo pattern, such as is proposed in the U.S. Pat. No. 3,691,543, on the inner most and the outermost peripheries of the disc. Using a head position sensor, the magnetic head is controlled to be at a predetermined position in the vicinity of, for example, the innermost servo track. A tracking error signal, detected upon reproducing the servo track, is used to shift the magnetic head to a center of the servo track, that is a servo track center, so that the tracking error signal will be equal to zero, and a detection error of the head position sensor, obtained at this time from the head position sensor, is found. The similar operation is performed on the outermost servo track to find the detection error of the head position sensor at the outermost periphery of the magnetic disc.

Then, during the time when the data track or tracks are sequentially formed in a data area delimited between the two servo tracks, the magnetic head is controlled to be positioned in the vicinity of a desired data track center with the aid of the head position sensor. Then, as a function of the position of the data track scanned by the magnetic head, a required correction amount, referred to hereinafter as an off-track correction amount, is found by, for example, linear approximation, with the aid of two detection errors of the head position sensor, and tracking control of the magnetic head is performed on the basis of the off-track correction amount. In this manner, a number of data tracks are formed concentrically with respect to the servo tracks.

For recording or reproducing data on or from each data track, detection errors of the head position detection sensor are detected at a predetermined time interval, and the off-track correction amount at a desired data track is found on the basis of the detection error. Tracking control of the magnetic head is performed on the basis of this off-track correction amount.

In this manner, the magnetic head may be tracking-controlled on the basis of the servo tracks formed on the innermost and outermost peripheries of the magnetic disc.

On the other hand, with a disc drive apparatus in which the data track pitch of the magnetic disc is reduced to increase the recording capacity, the following system is used as the head position sensor.

Figure 1:
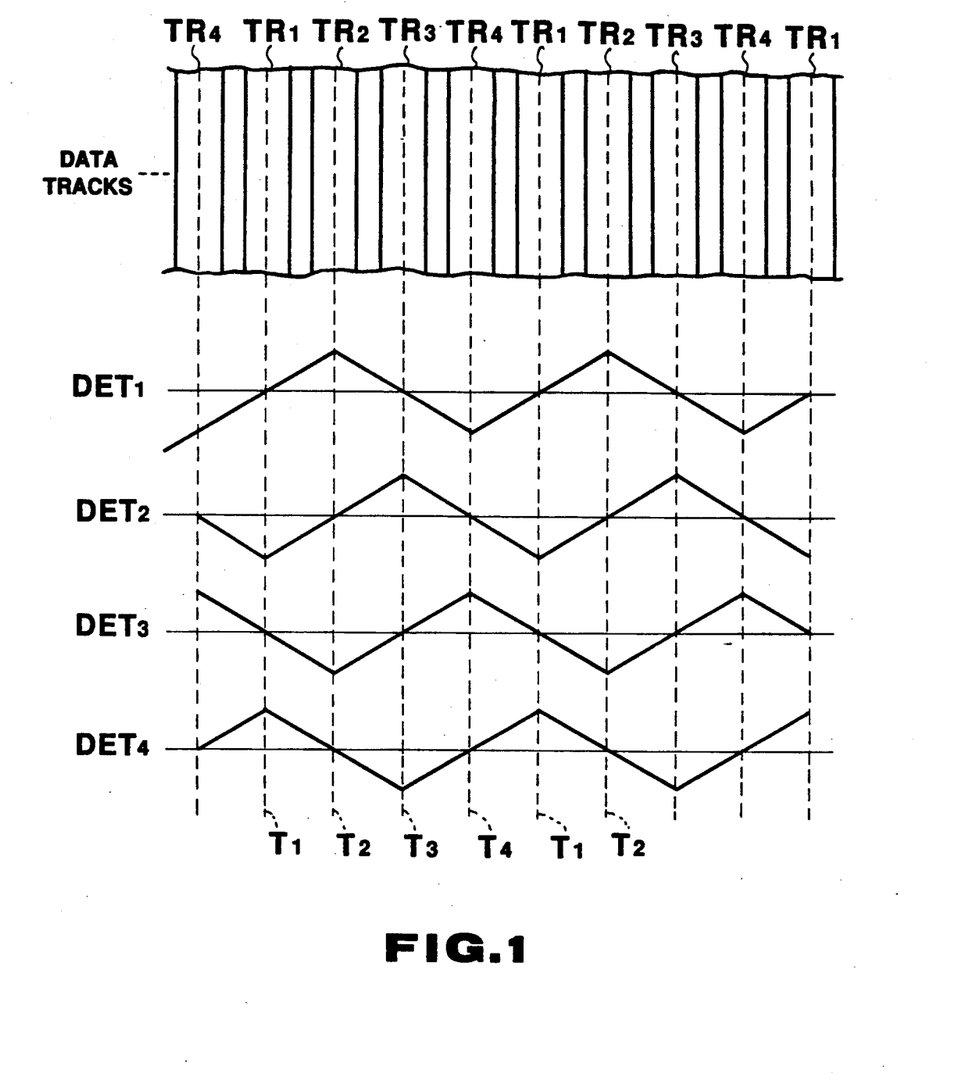
FIG. 1 is a diagrammatic view showing the relation between the data track and the detection signals of the head position sensor.

The light emanating from a light source is passed through a reticle by way of a scale mounted on an arm of a magnetic head and the light thus transmitted through the reticle is detected by photo-electric converter segments. The scale and the reticle are provided with slits at a predetermined interval and when the position of the scale is changed relative to that of the reticle with movement of the magnetic head, the volume of the light incident on the photoelectric converter segments by means of the scale and the reticle is changed. For example, in the case of the head position sensor comprised of four juxtaposed photoelectric converter segments, four-phase detection signals $DET_1$ to $DET_4$ having different phases are produced from the respective photoelectric converting segments, as shown in FIG. 1. The positions T1 to T4, corresponding to the phases of these detection signals crossing the zero level in, for example, the rightwardly rising direction, prove to be the track centers.

Hence, with the above head position sensor generating the four-phase detection signals, it is necessary to calculate the above mentioned off-track correction amount for each of the photoelectric converting segments. Therefore, servo tracks associated with the respective photoelectric converting segments are provided as the innermost and outermost tracks, that is a total of eight servo tracks, ar provided on the disc surface, for calculating the above mentioned off-track correction amounts.

On the other hand, with disc drive apparatus employing plural magnetic discs for enlarging the recording capacity, the following tracking control is used.

The magnetic discs are arranged coaxially and driven into rotation by a sole spindle motor. When the servo track is formed only one disc surface, and the data track is formed on the disc surface on which the servo track is formed, the magnetic head scanning the disc surface on which the servo track is formed and the magnetic head scanning the disc surface on which the servo track is not formed are kinematically interlocked so that data tracks may be formed simultaneously on the disc surface carrying the servo track and the disc surface devoid of the servo track. In this case, even if the magnetic heads suffer from different mounting errors, these magnetic heads are rotated in unison, so that by finding the off-track correction amount of the head position sensor with the use of the servo track formed on one disc surface, it becomes possible to perform a correct tracking control of the magnetic heads scanning the disc surfaces.

However, with the disc drive apparatus adapted for performing tracking control of the disc surface with the use of the servo track formed on only one disc surface, the problem is raised that sufficiently accurate tracking control cannot be achieved.

For example, the mounting accuracy may be changed by, for example, several micrometers ($\mu$ms) between the magnetic heads scanning the disc surfaces, due to, for example, changes in the ambient temperature, so that, even if tracking control of the magnetic heads scanning the disc surfaces is performed unanimously on the basis of the servo track formed on one disc surface as described above, a tracking error corresponding to changes in the mounting accuracy between the magnetic heads due to changes in temperature is produced. As a result, the tracking control accuracy is correspondingly deteriorated to worsen the error rate.

Among the methods for coping with this problem, there is a method as disclosed in Japanese Patent Publication No. 220274/1989. Thus there is known a method comprising forming a servo track on each of the disc surfaces and correcting an off-track amount of the head position sensor on each disc surface.

However, a prolonged operation would be necessitated if a sum total of eight servo tracks associated with the respective phases of the detection signals of the head position sensor is formed on the innermost and outermost peripheries of the respective disc surfaces, and the off-track amounts of the head position sensors are corrected for each disc surface.

On the other hand, when recording or reproducing data on or from the magnetic disc, a tracking control is performed, according to which, after the magnetic head is moved at a high speed to the target data track (seeking), the magnetic head is caused to scan the center of the data track.

For performing such high-speed seeking of the magnetic head, the velocity of the movement of the head arm carrying the magnetic head is controlled as a function of the distance from the current head position to the target track, that is the number of tracks to be crossed by the head, for controlling the velocity of the movement of the magnetic head carried by the foremost part of the head arm along the radius of the disc.

Figure 2:
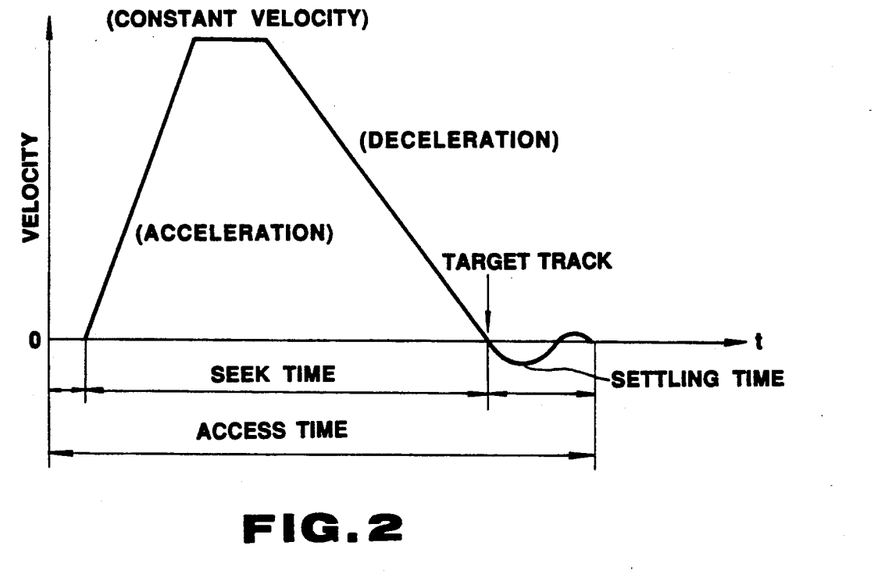
FIGS. 2 and 3 are charts showing the magnetic head velocity during seeking.

Referring to FIG. 2, if the target track is at some distance, for example, the magnetic head is accelerated at a maximum acceleration up to a constant velocity, usually the maximum velocity, the magnetic head is then moved at the constant velocity until the number of the remaining tracks is reduced to a predetermined number, and the magnetic head is then decelerated at a predetermined deceleration after the number of the remaining tracks is lesser than a predetermined value. That is, while the velocity of the magnetic head is continuously detected, the magnetic head is decelerated to a velocity which is inversely proportionate to the number of remaining tracks, until the velocity is reduced to zero in the vicinity of the target track. This control mode is referred to hereinafter as the velocity control mode. Then, as the magnetic head position is continuously detected, the magnetic head is then position controlled so that the head is positioned at the center of the target track. This control mode is referred to hereinafter as the position control mode. In this case, the time which elapses since the magnetic head starts to be accelerated until the velocity of the magnetic head is reduced to zero is referred to as the seek time. Meanwhile, the time which elapses since the velocity of the magnetic head is reduced to zero until the magnetic head is positioned at the center of the target track is referred to as the setting time.

Figure 3:
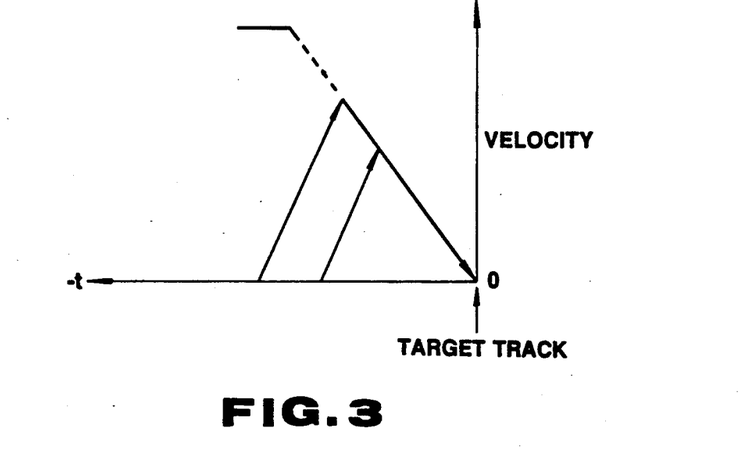

On the other hand, when the target track is at a not-distant position, the magnetic head is accelerated at the maximum acceleration, as shown in FIG. 3. When the number of the remaining tracks is lesser than a predetermined value, the magnetic head is decelerated at a predetermined deceleration. that is, as the velocity of the magnetic head is detected continuously, the magnetic head is controlled to be decelerated to a velocity which is inversely proportional to the number of the remaining tracks so that the velocity of the magnetic head is reduced to zero in the vicinity of the target track. then, as the magnetic head position is detected continuously, the magnetic head is shifted in controlled manner so that the magnetic head is positioned at the center of the target track.

It will be noted that the above mentioned seek time significantly influences the access time which is among the critical properties in recording or reproducing data in the disc drive apparatus, and hence standards or prescriptions are provided for the seek time. Thus, in the manufacture process of the disc drive apparatus, a sufficient adjustment operation is performed before shipment of the apparatus so that the seek time during which the magnetic head seeks one-thirds of the disc radius is included within a predetermined standard value.

The conventional practice has been to perform such seek time adjustment by a manual operation by using a volume knob. However, the weight of the head arm, the torque of the motor driving head arm or the output of the head position sensor are fluctuated from one disc apparatus to another, such that a number of adjustment steps are necessitated, thus increasing manufacture costs. On the other hand, the volume knob is inferior in reliability to the usual resistor.

OBJECTS AND SUMMARY OF THE INVENTION

It is therefore a primary object of the present invention to provide a disc drive apparatus in which the magnetic head position is detected using position detection signals having plural phases and in which the correction of the off-track amounts on the respective disc surfaces may be performed in a shorter time than heretofore to realize tracking control with a high accuracy.

It is a second object of the present invention to provide a highly reliable disc drive apparatus in which the manual seek time adjustment process of the magnetic head apparatus is not necessitated and the seek time may be automatically adjusted without being affected by weight fluctuations of the head arm in the disc drive apparatus.

For accomplishing the above mentioned first object of the present invention, the present invention provides a disc drive apparatus in which the detection error distribution along the disc radius of the respective phases of position sensing means is calculated on the basis of the reference detection error information of the respective phases of the position sensing means and the detection error distribution information along the disc radius of one of the phases of the position sensing means, the detection error of the respective phases of the position sensing means is corrected on the basis of the results of calculation and in which the tracking control of transducer means is performed on the basis of the thus corrected detection signals of the respective phases of the position sensing means.

Also, for accomplishing the above mentioned second object of the present invention, the present invention provides a disc drive apparatus in which the transducer means seeks the predetermined number of tracks as the difference between the velocity profile and the current of velocity of the movement of transducer means and in which the detection gain of the velocity detecting means is adjusted so that the seek time prescriptions will be satisfied.

DESCRIPTION OF THE PREFERRED EMBODIMENT

Figure 4:
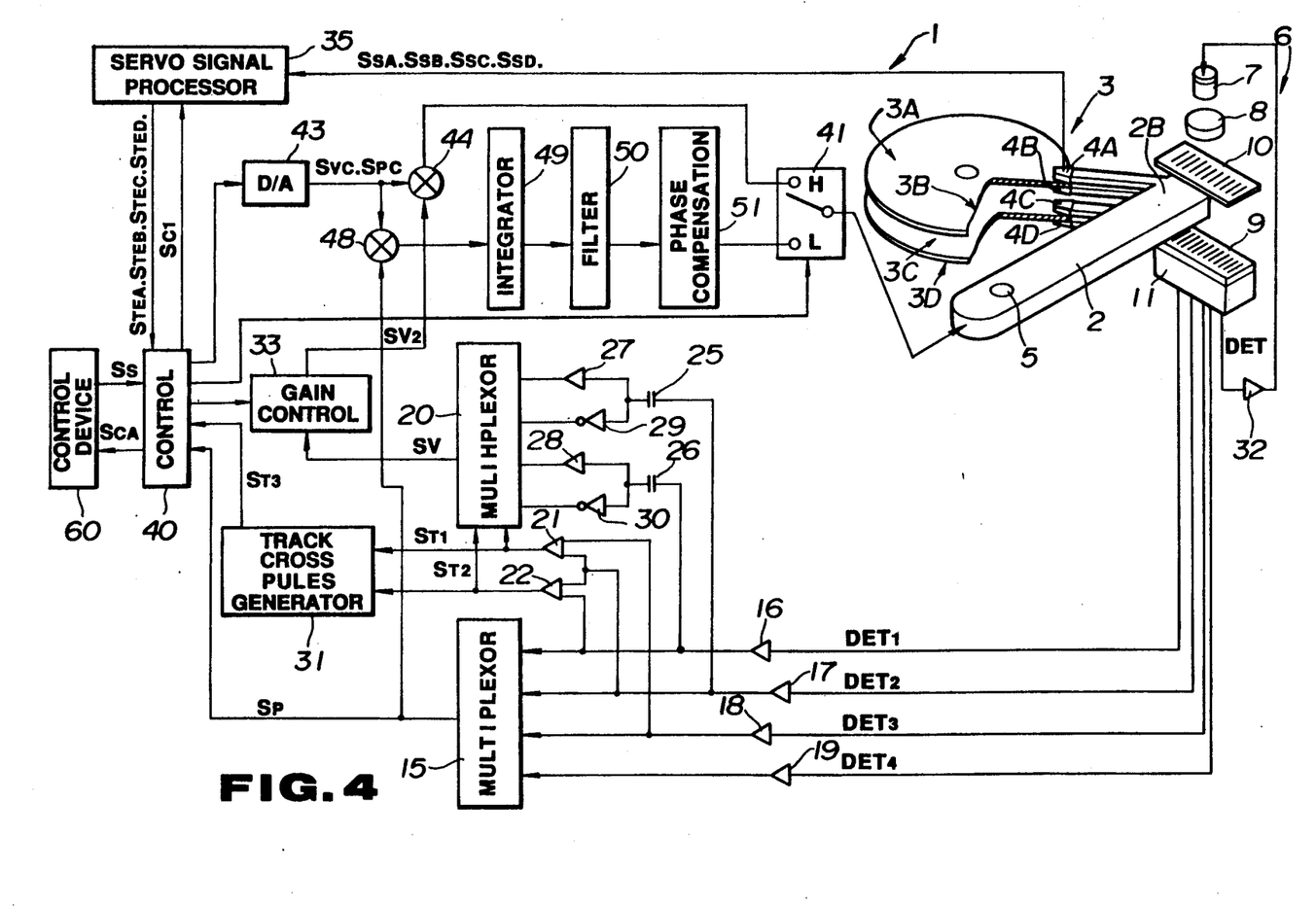
FIG. 4 is a block circuit diagram of a disc drive apparatus according to the present invention.

By referring to the drawings, a preferred embodiment of a disc drive apparatus according to the present invention will be explained in detail. FIG. 4 is a block circuit diagram of the disc drive apparatus according to the present invention and FIG. 5 is a diagrammatic view showing the recording mode or format for a magnetic disc.

Referring to FIG. 4, magnetic heads or transducer means 4A, 4B, 4C and 4D, scanning disc surfaces 3A, 3B, 3C and 3D of two magnetic discs 3, respectively, are attached to one end of a Y-shaped head arm 2.

Figure 5:
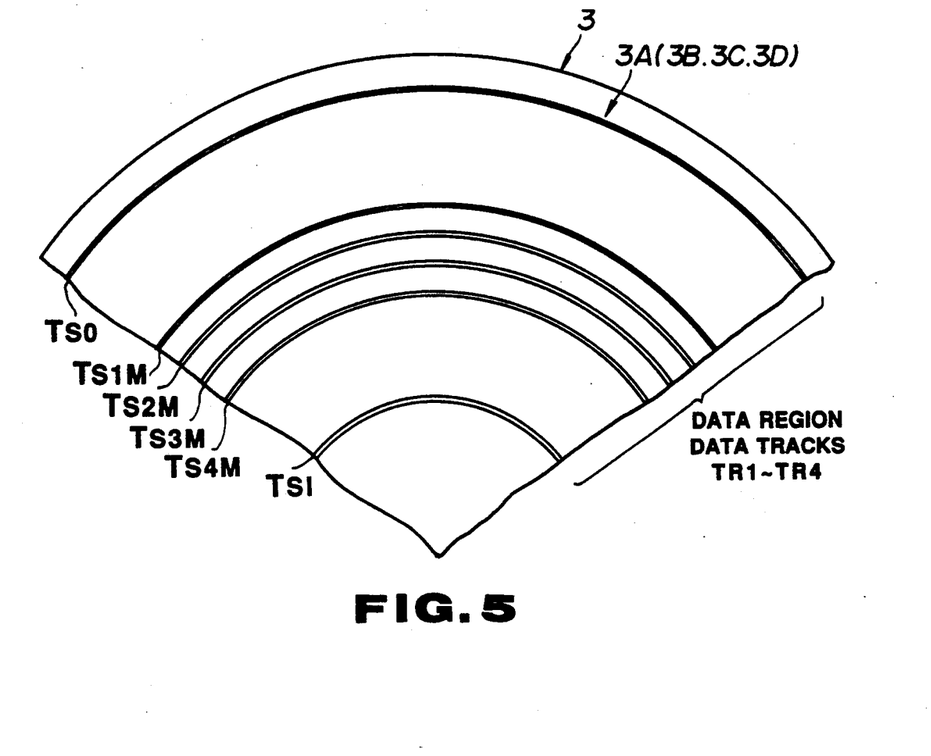
FIG. 5 shows the recording mode for the magnetic disc employed in the disc drive apparatus shown in FIG. 4.

Referring to FIG. 5, servo or reference tracks $T_{S1}$, $T_{S0}$, each having a tribit servo pattern, are formed at the innermost and outermost peripheries of the disc surfaces 3A, 3B, 3C and 3D of the magnetic discs 3, while four servo or reference tracks $T_{S1M}$, $T_{S2M}$ $T_{S3M}$ and $T_{S4M}$ are formed substantially centrally of a data region in adjacency to one another. In the remaining data region, data-recording tracks or data tracks TR1 to TR4 are formed sequentially cyclically under tracking control of the magnetic heads 4A to 4D based on off-track correction amounts derived from the servo tracks $T_{S1M}$ to $T_{S4M}$, as will be explained subsequently. That is, for detecting the positions of the magnetic heads 4A, 4B, 4C and 4D with respect to the data tracks TR1 to TR4, position sensing signals having, for example, for phases, are used, with each phase of the position sensing signals indicating the positions of the magnetic heads 4A, 4B, 4C and 4D with respect to the data tracks TR1 to TR4. The servo tracks $T_{S1}$ and $T_{S0}$ are formed in association with the phase showing the positions of the magnetic heads 4A, 4B, 4C and 4D with respect to the data track TR1. Meanwhile, the servo tracks $T_{S1}$ and $T_{S0}$ may also be formed in association with the phases indicating the positions of the magnetic heads 4A to 4D with respect to any one of the remaining data tracks TR2 to TR4. In this manner, with the present embodiment, the magnetic disc 3 is employed as a disc medium on which reference tracks $T_{S1}$ and $T_{S2}$ associated with the same one of the plural phases of the position signals are formed in each of first and second reference regions and on which four reference tracks $T_{S1M}$ and $T_{S4M}$ associated with the respective phases of the position signals are also formed in third reference region.

The head arm 2 may be rotated about a pivot shaft 5 as the center of rotation so that the magnetic heads 4A, 4B, 4C and 4D may be move in unison along the radius of the disc 3 so that the magnetic heads 4A to 4D may be tracking-controlled with respect to a large number of the data tracks TR1 to TR4 formed concentrically on the disc surfaces 3A, 3B, 3C and 3D of the magnetic disks 3.

To the other end 2B of the head arm 2 is provided a head position sensor or position sensing means 6, which is adapted for outputting detection signals explained in connection with the prior art with reference to FIG. 1 and is constituted in the following manner. That is, the head position sensor 6 is so arranged that the light exiting a light source 7 is transmitted through a reticle 9 by means of a lens 8 and a scale 10 attached to the foremost part of the head arm 2, and that the transmitted light is supplied therefrom to a photosensor 11 constituted by, for example, five photoelectric converting segments.

The reticle 9 and the scale 10 are each provided with slits having a predetermined interval, such that, when the relative position of the scale 10 with respect to the reticle 9 is changed with rotation of the head arm 2, the volume of light incident on the photoelectric converting segments of the photosensor 11 by means of the reticle 9 and the scale is changed.

That is, the arrangement is so made that, as the magnetic heads 4A to 4D are moved as a unit along the radius of the disc, detection signals $DET_1$, $DET_2$, $DET_3$ and $DET_4$, indicating the gross positions of the magnetic heads 4A to 4D with respect to the data tracks TR1 to TR4, may be derived from four of the above mentioned five photoelectric converters. The above mentioned slits are formed in such a manner that the signal levels of the detection signals $DET_1$ and $DET_4$ are sequentially changed in the form of triangular signals having a phase difference of 90° when the magnetic heads 4A to 4D cross the data tracks TR1 to TR4 inwardly or outwardly at a predetermined velocity. The positions at which the detection signals $DET_1$ to $DET_4$ cross the zero level in the rightwardly rising direction prove to be the positions $T_1$ to $T_4$ at which the magnetic heads 4A, 4B, 4C to 4D roughly track the four sequentially adjoining data tracks $TR_1$ to $TR_4$. Therefore, by detecting the time points when the detection signals $DET_1$ TO $DET_4$ cross the zero level in the rightwardly rising direction during rotation of the head arm 2, it can be detected that the magnetic heads 4A, 4B, 4C and 4D are at the positions, T1, T2, T3 and T4, respectively. Also, by differentiating the detection signals $DET_1$ to $DET_4$ from the head position sensor 6, the velocity of radial movement of the magnetic heads 4A to 4D during the rotation of the head arm 2 may be detected. Thus, with the present embodiment, the head position sensor 6 is used as position sensing means for outputting position detection signals $DET_1$ to $DET_4$ having four phases each indicating the positions of the magnetic head 4A to 4D along the radius of the disc.

Since the tracking control of the disc surfaces 3A to 3D by the associated magnetic heads 4A to 4D remains the same, the tracking control of the disc surface 3A by the magnetic head 4A will be hereinafter explained.

On the basis of the above described measurement principle, a multiplexor 15 receives the detection signals $DET_1$ to $DET_4$ by means of amplifiers 16, 17, 18 and 19, respectively, selects a one-phase detection signal which remains linear in the vicinity of the target track, and outputs the selected output as a position detection signal $S_p$.

On the other hand, a multiplexor 20 receives detection signals $DET_1$ and $DET_2$, outputted from amplifier 16 and 17 by means of capacitors 25 and 26 and amplifiers 27 and 28, while also receiving differentiated signals of the detection signals $DET_1$ and $DET_2$ and inverted signals of the differentiated signals of the detection signals $DET_1$ and $DET_2$ by means of inverting amplifiers 29 and 30. The multiplexor 20 then selects the differentiated signal which is linear and oriented correctly to output the selected output signal as a velocity detection signal $S_V$ indicating the velocity with which the magnetic head 4A crosses the data track. A control circuit 40 controls the gain of a gain control circuit 33 constituted by, for example, an amplifier, to amplify or attenuate the velocity detection signal $S_V$ to transmit an amplified or attenuated velocity detection signal $S_{V2}$ to an addition circuit 44.

In the multiplexor 20, the above mentioned selective control is performed on the basis of the control signals from comparators 21 and 22. That is, the detection signals $DET_1$ to $DET_3$, obtained by means of amplifiers 16 to 18, are compared at comparators 21 and 22, and the resulting two control signals $S_{T1}$ and $S_{T2}$, which are dephased 180° relative to each other and which rise in signal level each time the magnetic head 4A crosses four data tracks, are utilized during the aforementioned selective control of the multiplexor 20. A track cross pulse generator 31 makes use of these dephased control signals $S_{T1}$ and $S_{T2}$ to generate a data track count signal $S_{T3}$ rising in signal level with each crossing of a data track by the magnetic head 4A, and outputs the data track count signal $S_{T3}$ to the control circuit 40.

In this manner, with the present embodiment, the head arm 2 constitutes actuator means for driving the magnetic head 4 radially of the disc, whereas the velocity detecting means adapted for detecting the velocity of the movement of the magnetic head 4 is constituted by the aforementioned head position sensor 6, amplifiers 16 to 18, 27 and 28, capacitors 25 and 26, inverting amplifiers 29 and 30, comparators 21 and 22, multiplexor 20 and the gain control circuit 33.

Meanwhile, the detection signal DET, obtained from the remaining one of the photoelectric converting segments of the photosensor 11, is adapted to be fed back to the light source 7 by means of amplifier 32 to maintain the light volume of the light source 7 at a predetermined value.

A servo signal processing circuit 35, on the other hand, is adapted to receive servo signals $S_{SA}$, $S_{SB}$, $S_{SC}$ and $S_{SD}$, obtained upon detecting the servo tracks $T_{S0}$ on the disc surfaces 3A to 3D, by means of the magnetic heads 4A to 4D, respectively, and is responsive to a changeover signal $S_{C1}$ for defectively outputting tracking error signals $S_{TEA}$, $S_{TEB}$, $S_{TEC}$ and $S_{TED}$ of the magnetic heads 4A, 4B, 4C and 4D, respectively.

The control circuit 40 in a processing circuit configuration outputs a changeover signal $S_{C2}$ to a selection circuit 41 when the power source is turned on, and sets the changeover signal $S_{C2}$ to, for example, a logically high (H) level, thereby shifting a movable contact of the circuit 41. The control circuit 40 then outputs a movement direction control signal $S_D$ indicating the movement direction, while also outputting, by means of a D/A converter 43 and an addition circuit 44, a velocity control signal $S_{VC}$ which is consistent with the number of tracks sought by the magnetic head 4A and which has a profile shown for example in FIG. 6. The control circuit 40 then causes the magnetic head 4A to be shifted to the inner most servo track $T_{S1}$ to detect a reference off-track amount of the disc surface 3A with respect to the servo track $T_{S1}$ on the basis of the detection signal $DET_1$.

More specifically, the addition circuit 44 receives the velocity control signal $S_{VC}$ and the velocity detection signal $S_{V2}$ and an actuator, not shown, is driven to shift the magnetic head 4A so that an error signal derived from the addition circuit 44 will be at a zero level.

At this time, the control circuit 40 outputs the velocity control signal $S_{VC}$, on the basis of a data track count signal $S_{T3}$ from the track cross pulse generator 31, so that the magnetic head 4A is first moved in a shorter time to the innermost servo track $T_{S1}$ whilst the number of the data tracks traversed by the magnetic head 4A is counted continuously. This mode is referred to as a speed control mode.

As the magnetic head 4A approaches the target servo track $T_{S1}$, the control circuit 40 outputs the changeover signal $S_{C2}$ and sets the changeover signal $S_{C2}$ to, for example, a low (L) level for shifting the movable contact of the circuit 41. The control circuit 40 is then responsive to a position detection signal $S_p$, obtained by means of the multiplexor 15, to output a position control signal $S_{PC}$ by means of D/A converter 43. It is noted that the detection signal $DET_1$ associated with the servo track $T_{S1}$ is selectively outputted as the above mentioned position detection signal $S_p$.

An addition circuit 48 receives the position control signal $S_{PC}$ and the position detection signal $S_p$ and outputs a resulting error signal to the actuator by means of an integrator 49, a filter circuit 50 and a phase compensation circuit 51. In this manner, the magnetic head 4A is controlled to a position at which the error signal obtained by means of the addition circuit 48 is at the zero lend, that is at a position $T_1$ associated with the phase of the detection signal $DET_1$ crossing the zero level. This mode is referred to as a position control mode.

The control circuit 40 then outputs the changeover signal $S_{C1}$, fetches tracking error signal $S_{TEA}$ of the magnetic head 4A from the servo signal processing circuit 35 and outputs the position control signal $S_{PC}$ by means of the D/A converter 43, so that the tracking error signal $S_{TEA}$ will be at the zero level.

In this manner, the magnetic head 4A is controlled to a state of precisely tracking the servo tack $T_{S1}$ on the disc surface 3A, with the detection signal $DET_1$ as the reference.

The control circuit 40 includes a memory circuit and stores the position control signal $S_{PC}$ prevailing when the magnetic head 4A is tracking controlled to a precisely tracking state in the memory circuit as the inner periphery side reference off-track amount with references to the servo track $T_{S1}$ of the magnetic head 4A.

In this manner, the reference off-track amount with respect to the servo track $T_{S1}$ provided on the disc surface 3A is obtained, with the detection signal $DET_1$ as the reference, and is stored in the memory circuit.

The control circuit 40 then sets the operating mode to the speed control mode to shift the magnetic head 4A to the outermost servo track $T_{S0}$. The control circuit 40 is then reset to the position control mode for position controlling the magnetic head 4A to the position T1 at which the detection signal $DET_1$ associated with the servo track $T_{S0}$ crosses the zero level.

As in the case of producing the reference off-track amount with respect to the servo track $T_{S1}$ as mentioned above, the reference circuit 40 detects the outer peripheral side reference off-track amount with respect to the servo track $T_{S0}$ provided on the disc surface 3A, using the detection signal $DET_1$ as the reference, and causes the detected reference off-track amount to be stored in the memory circuit.

Then, by using the above mentioned two reference off-track amounts, that is the innermost and outermost reference off-track amounts, the control circuit 40 calculate the distribution of detection errors of one of the photoelectric converting segments of the head position sensor 6 along the disc radius. Thus, by performing linear approximation of the above mentioned two reference off-track amounts in the data region of the disc surface 3A, the error distribution of the one phase detection signal $DET_1$ of the head position sensor 6 along the disc radius is found. That is, using the innermost servo track $T_{S1}$ and the outermost servo track $T_{S0}$ provided on the disc surface 3A, the control circuit 40 calculates the detection error distribution of one of the photoelectric converting segments of the head position sensor 6 along the disc radius. Thus, with the present embodiment, the first off-track amount detection means, calculating the detection error distribution of the position sensing means along the disc radius, is constituted by the magnetic head 4A, servo signal processing circuit 35, control circuit 40, selection circuit 41, D/A converter 43, addition circuits 44 and 48, integrating circuit 49, filer circuit 50 and a phase compensation circuit 51.

The control circuit 40 sets the operating mode to the velocity control mode to shift the magnetic head 4A to a servo track $T_{S1M}$ provided at substantially the center of the data region. The control circuit 40 then sets the operating mode to the position control mode for position controlling the magnetic head 4A to the position T1 at which the detection signal $DET_1$ associated with the servo track $T_{S1M}$ crosses the zero level. As in the case of obtaining the reference off-track amount for the servo track $T_{S1}$ as described above, the control circuit 40 detects the reference off-track amount for the servo track $T_{S1M}$ on the disc surface 3A, using the detection signal $DET_1$ as the reference, and causes the thus detected reference off-track amount for the servo track $T_{S1M}$ to be stored in the memory circuit.

As in the case of obtaining the reference off-track amount for the servo track $T_{S1}$ as described above, the control circuit 40 causes the magnetic head 4A to be shifted sequentially to the next succeeding inner servo tracks $T_{S2M}$ to $T_{S4M}$ for sequentially position controlling the magnetic head 4A to the positions T2, T3 and T4 at which the detection signals $DET_2$ to $DET_4$, associated with the servo tracks $T_{S2M}$ to $T_{S4M}$, respectively, cross the zero level. At this time, the control circuit 40 detects the reference off-track amounts for the servo tracks $T_{S2M}$ to $T_{S4M}$ provided on the disc surface 3A, using the detection signals $DET_2$ to $DET_4$ as the reference, and causes the detected reference off-track amounts to be stored in the memory circuit.

In this manner, the reference off-track amounts, associated with the servo tracks $T_{S1M}$ to $T_{S4M}$ provided substantially at the center of the disc surface 3A, may be obtained, using the detection signals $DET_1$ to $DET_4$ as the reference. This is, it becomes possible, by using the servo tracks $T_{S1M}$ to $T_{S4M}$ provided on the data area of the disc surface 3A, to detect the reference detection error of each of the photoelectric converting segments of the head position sensor 6. Thus, with the present embodiment, the second off-track amount detection means for detecting the reference detection error of the respective phases of the position sensing means is constituted by the magnetic head 4A, servo signal processing circuit 35, control circuit 40, selection circuit 41, D/A converter 43, addition circuits 44 and 48, integration circuit 49, filter circuit 50 and the phase compensation circuit 51.

During seeking the control circuit 40 receives a selection command signal $S_S$ of selecting the disc surface and the data track, from a control device 60 of the processing circuit configuration, which is connected to outside. Then, responsive to the selection command signal $S_S$, the control circuit 40 causes the magnetic head 4A to be shifted to the desired data track.

The control circuit 40 is then responsive to the position detection signal $S_p$ (selection output signal for the detection signals $DET_1$ to $DET_4$ associated with the selected data tracks TR1 to TR4) to position control the magnetic head 4A.

The control circuit 40 then selects one reference off-track amount associated with selected one of the data tracks TR1 to TR4, after which it calculates, using one of the detection signals $DET_1$ to $DET_4$ associated with the related data track as the reference, the off-track correction amount necessary for position controlling the magnetic head 4A.

Figure 7:
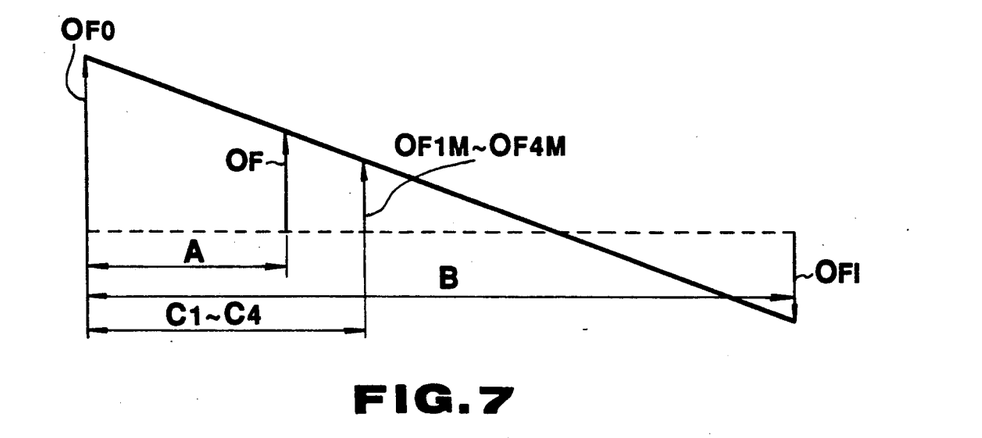
FIG. 7 is a chart for illustrating the principle of calculating the off-track correction amount in the disc drive apparatus shown in FIG. 4.

More specifically, referring to FIG. 7, in which $O_{F1}$ and $O_{F0}$ denote two reference off-track amounts prevailing when the magnetic head 4A is position controlled to the innermost and outermost servo tracks $T_{S1}$ and $T_{S0}$, with the detection signal $DET_1$ as the reference, and $O_{F1M}$, $O_{F2M}$, $O_{F3M}$ and $O_{F4M}$ denote the reference off-track amounts prevailing when the magnetic head 4A is position controlled to servo tracks $T_{S1M}$ to $T_{S4M}$ provided substantially centrally of the data area, with the detection signals $DET_1$ to $DET_4$ as the reference, respectively, the off-track correction amount $O_F$ prevailing when the magnetic head 4A is sequentially position controlled to data tracks from the outer towards the inner peripheries, with the detection signals $DET_1$ to $DET_4$ as the reference, is changed linearly from the reference off-track amount $O_{F0}$ to the reference off-track amount $O_{F1}$, on the condition that the data tracks are formed at a constant pitch.

That is, if B denotes the total number of the data tracks and $C_1$, $C_2$, $C_3$ and $C_4$ denote the numbers of the servo tracks from the outermost servo track $T_{S0}$ as far as the servo tracks $T_{S1M}$ to $T_{S4M}$, the off-track correction amount $O_F$ for the Ath data track from the outermost servo track $T_{S0}$ may be given by $$O_F = O_{F1M} + (O_{F1} - O_{F0}) \times (A - C_1)/B$$

for the data track TR1 detected by using the detection signal $DET_1$; by $$O_F = O_{F2M} + (O_{F1} - O_{F0}) \times (A - C_2)/B$$

for the data track TR2 detected by using the detection signal DET2; by $$O_F = O_{F3M} + (O_{F1} - O_{F0}) \times (A - C_3)/B$$

for the data track TR3 detected by using the detection signal DET3; by $$O_F = O_{F4M} + (O_{F1} - O_{F0}) \times (A - C_4)/B$$

for the data track TR4 detected by using the detection signal DET4.

Therefore, the off-track correction amount necessary for a given data track may be calculated on the basis of the gradient or distribution of the off-track amounts obtained from the innermost and outermost servo tracks $T_{S0}$ and $T_{S1}$, and the reference off-track amounts of the detection signals $DET_1$ to $DET_4$ obtained from the servo tracks $T_{S1M}$ to $T_{S4M}$, respectively. After position controlling the magnetic head 4A, with the detection signals $DET_1$ to $DET_4$ as the reference, the above mentioned off-track correction amount is outputted to the D/A converter 43 for minutely shifting the magnetic disc 4A, thereby precisely tracking the magnetic head 4A on a desired one of the data tracks on the disc surface 3A.

In this manner, after the magnetic head 4A is brought to the precisely tracking state with respect to a predetermined one of the data tracks, the control circuit 40 is responsive to a data signal, not shown, outputted from the control device 60, for recording or reproducing data on or from the data track. That is, with the present embodiment, the control circuit 40 is used as off-track amount correction means for correcting the detection error of the respective phases of the position sensing means.

Meanwhile, tracking control for the remaining, disc surfaces 3B, 3C and 3D may be performed similarly to that for the disc surface 3A. That is, by using the servo tracks $T_{S1}$, $T_{S0}$ and $T_{S1M}$ to $T_{S4M}$, formed on each of the disc surfaces 3B, 3C and 3D, a tracking control similar to that for the disc surface as described above may be performed on the disc surface selected by the selection command signal $S_S$ from the control device 60.

The control circuit 40 is also provided with a counter circuit and, after lapse of a predetermined time interval, outputs a call signal $S_{CA}$ to the control device 60 to detect whether or not the disc drive apparatus 1 in its entirety is in the accessable state.

If it is detected that the disc drive apparatus 1 is not in the accessable state, the control circuit 40 causes the magnetic heads 4A, 4B, 4C and 4D to be sequentially shifted to the innermost servo track $T_{S1}$, the outermost servo track $T_{S0}$ and to the servo tracks $T_{S1M}$ to $T_{S4M}$ in the data region on each of the disc surfaces 3A, 3B, 3C and 3D, while sequentially outputting the changeover signals $S_{C1}$ for updating the reference off-track amounts with the use of the tracking error signals $S_{TEA}$ to $S_{TED}$ of the magnetic heads 4A, 4B, 4C and 4D obtained from the servo signal processing circuit 35.

In this manner, by detecting the reference off-tracks amounts for each of the disc surfaces 3A, 3B, 3C and 3D, and updating the off-track correction amounts for each of the disc surfaces 3A, 3B, 3C and 3D at a predetermined time interval, the magnetic heads 4A, 4B, 4C and 4D may be brought to the precisely tracked state, even if the mounting accuracies of the magnetic heads 4A, 4B, 4C and 4D scanning the disc surfaces 3A, 3B, 3C and 3D are changed with changes in the ambient temperature. The result is that the error rate may be prevented from being worsened and tracking control may be performed with a higher accuracy than heretofore. Also the time for detecting the reference off-track amount may be shortened since only six (6) servo tracks $T_{S0}$, $T_{S0}$ and $T_{S1M}$ to $T_{S4M}$, which is lesser than heretofore, are used, while the setup time, which elapses since turning on of the power source until the start of the regular operation of the disc drive apparatus, for example, may be shortened significantly.

It is to be noted that the present invention is not limited to the above described embodiment. For example, the servo tracks $T_{S1}$ and $T_{S0}$ may be provided at some other positions than the innermost or the outermost position, whereas the servo tracks $T_{S1M}$ to $T_{S4M}$ may be provided at some other positions than at substantially the center of the data region. The servo tracks $T_{S1M}$ to $T_{S4M}$ may also be provided at the innermost or outermost positions and one of the servo tracks $T_{S1}$ or $T_{S0}$ may be used simultaneously as the servo track $T_{S1M}$.

A kinked line approximation may also be performed with the use of the three servo tracks $T_{S1}$, $T_{S0}$ and $T_{S1M}$ to produce the off-track correction amount.

With the above described disc drive apparatus, the seek time may be adjusted automatically in the production process, as will be explained below. Meanwhile, the magnetic heads 4A, 4B, 4C and 4D are collectively referred to hereinafter as the magnetic head, whereas the disc surfaces 3A, 3B, 3C and 3D are collectively referred to hereinafter as the disc surface 3.

Thus, upon reception of a command for automatically adjusting the seek time from the control device 60, the control circuit 40 in the processing circuit configuration outputs the changeover signal $S_{C2}$ to the selection circuit 41 and sets the signal $S_{C2}$ to the H level to shift the movable contact to the H position. The control circuit 40 then outputs the shift direction control signal $S_D$ indicating the shift direction, while outputting, by means of D/A converter 43 and addition circuit 44, the velocity control signal $S_{VC}$ which is consistent will the number of the tracks sought by the magnetic head 4 and which has a profile shown for example in FIG. 6. Thus the control circuit 40 causes the magnetic head 4 to be shifted towards the target data track. More specifically, the addition circuit 44 receives both the velocity control signal $S_C$ and the velocity detection signal $S_{V2}$, for thereby driving an actuator, not shown, for shifting the magnetic head 4 so that the error signal obtained by means of the addition circuit 44 will be at the zero level.

At this time, the control circuit 40 outputs the velocity control signal $S_{VC}$, on the basis of the data track count signal $S_{T3}$ from the track cross pulse generator 31, for thereby causing the magnetic head 4 to be shifted to the target data tracks, whilst the number of the data tracks continuously. Thus, with the present embodiment, profile generating means for generating the velocity profile in dependence upon the difference between the current magnetic head position and the target track position is constituted by the control circuit 40 and the D/A converter 43, whereas the driving control means for controlling the magnetic head driving means in dependence upon the difference between the velocity detection output from the velocity detection means and the velocity profile output from the profile generating means is constituted by the addition circuit 44 and the selection circuit 41.

When the magnetic head 4 approaches the target data track, the control circuit 40 outputs the changeover signal $S_{C2}$ to the selection circuit 41 and sets the signal $S_{C2}$ to, for example, the L level to shift the movable contact to the L position. The control circuit 40 then outputs the position control signal $S_{PC}$ by means of the D/A controller 43 in dependence upon the position detection signal $S_p$ obtained by means of the multiplexor circuit 15.

The addition circuit 48 receives the position control signal $S_{PC}$ and the position detection signal $S_p$ and outputs the resulting error signal to the actuator by means of the integrating circuit 49 and the phase compensation circuit 51. The result is that the magnetic head 4 is position controlled to a position at which the error signal obtained by means of the addition circuit 48 is at the zero level, for example, the position $T_1$ associated with the phase of the detection signal $DET_1$ crossing the zero level.

In the course of the above described operation, the control circuit 40 measures the time which elapses since the above described changeover signal $S_{C2}$ is set to the H level until it is re-set to the L level, that is, the seek time, by using a built-in timer circuit. Thus, with the present embodiment, the control circuit 40 functions as seek time measuring means for measuring the seek time during which the predetermined number of tracks are sought by the magnetic head 4 by the predetermined velocity profile output from profile velocity generating means.

The control circuit 40 then checks if the time when the magnetic head 4 seeks one-thirds of the disc satisfies the prescriptions. If the result is negative, the control circuit 40 controls the gain of the gain control circuit 33 to amplify or attenuate the velocity detection signal $S_V$. This operational sequence of measuring the seek time is repeated with the seek time prescriptions are satisfied. Thus, with the present embodiment, the control circuit 40 is simultaneously used as gain control means for controlling the detection gain of the velocity detection means by the output of the seek time measuring means.

Figure 8:
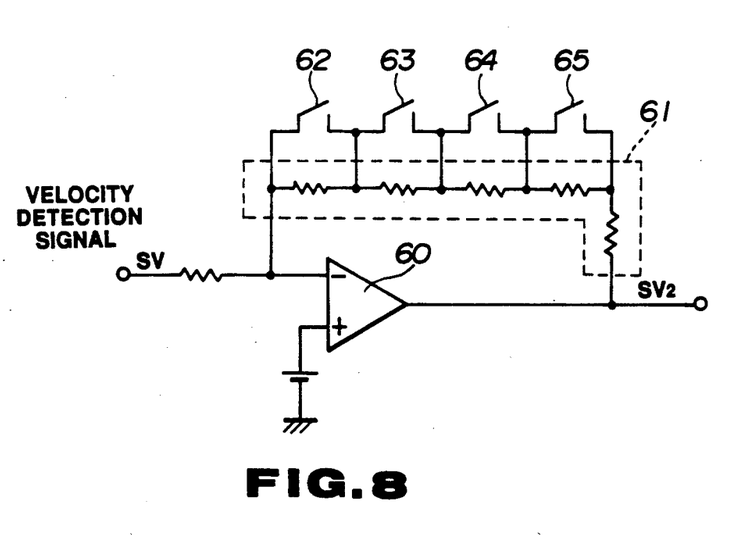
FIG. 8 is a circuit diagram showing a gain control circuit of the disc drive apparatus shown in FIG. 4.

Referring to FIG. 8, the gain control circuit 33 is constituted by the amplifier 60, a feedback resistance 61, composed of a ladder resistance, and analog switches 62 to 65. The control circuit 40 causes the analog switches 62 to 65 to be turned on or off to change the resistance value across the both ends of the feedback resistance 61, thereby changing the gain of the amplifier 60.

Figure 6:
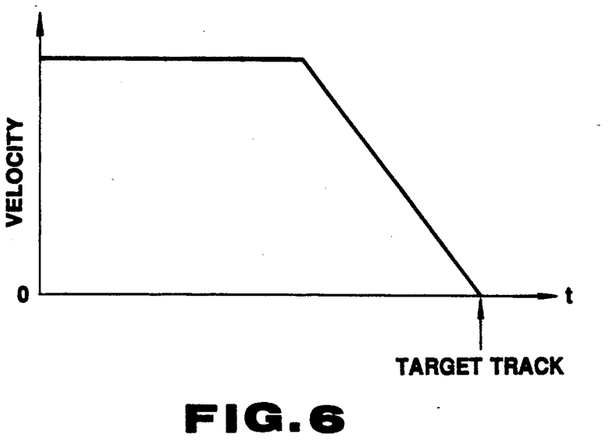
FIG. 6 is a chart showing a velocity profile in the disc drive apparatus shown in FIG. 4.

More specifically, the control circuit 40 turns the analog switches 62 to 65 off in their entirety, that is, sets the gain of the gain control circuit 33 to the maximum, in other words, sets the velocity of the magnetic head 4 to the minimum, while outputting the velocity control signal $S_{VC}$ having the profile as shown for example in FIG. 6 to the addition circuit 44 by means of the D/A converter 43 to cause the magnetic head 4 to seek a predetermined number of tracks, such as the number corresponding to one-third of the disc radius. The seek time on this occasion is measured. If the seek time is longer than the predetermined time, the analog switches 62 to 65 are sequentially turned on to raise the velocity of the magnetic head 4 progressively until the seek time reaches the predetermined value.

It will be seen from above that, by changing the detection gain of the velocity detection means detecting the velocity of the movement of the magnetic head 4 and thereby changing the actual velocity of the movement of the magnetic head 4, the time during which the magnetic head 4 seeks the predetermined number of tracks, that is the seek time, may be adjusted to be within the prescribed range. Also, by constituting the control circuit 40 by, for example, a microcomputer, and by storing the above described seek time adjustment sequence in the control circuit 40, the seek time may be adjusted automatically. That is, the seek time may be adjusted automatically even if the weight of the head arm 2, the torque of the motor driving the head arm 2, on the output of the head position sensor 6, are fluctuated from one disc drive apparatus to another. In addition, by the above described automatic adjustment, the number of process steps for seek time adjustment may be reduced with corresponding reduction in production costs. In addition, operational reliability may be improved by elimination of the volume knob.

Although it may be possible to change the above mentioned velocity profile output, that is the gain of the D/A converter 43, for changing the actual velocity of the magnetic head 4, if the circuit configuration in which the D/A converter 43 is simultaneously used for the position control mode, as in the above embodiment, is used, the loop gain of the control system in the position control mode would also be changed. However, with the circuit configuration in which the gain for velocity detection of the magnetic head 4 is changed, as in the present invention, only one D/A converter suffices, with an obvious economic advantage. In addition, since the volume knob is not used for seek time adjustment, the operational reliability may be improved as compared in the conventional system.

At may be seen from above that, with the disc drive apparatus of the present invention, the distribution of detection errors of the magnetic head position detection means along the disc radius is calculated by using two discrete servo tracks associated with a desired one of the phases of the position detection signals indicating the position of the magnetic head along the disc radius, while the reference detection errors of the respective phases of the magnetic head position detection means are detected by using the servo tracks associated with the phases of the position detection signals, for calculating the detection error distribution of the respective phases of the magnetic head position detection means along the disc radius. On the other hand, high accuracy tracking control may be performed on the basis of the detection error distribution of the respective phases of these magnetic head position detection means. In addition, since the detection errors of the magnetic head position detection means may be corrected by using a smaller number of the servo tracks than with the conventional system, the time which elapses since the turning on of the power source until the start of the regular operation of the disc drive apparatus, or the setup time, may be reduced significantly. Therefore, more outstanding results may be achieved with the disc drive apparatus in which plural magnetic discs are used for enhancing the recording capacity.

With the disc drive apparatus of the present invention, the detection gain of the velocity detection means detecting the velocity of the movement of the magnetic head may be changed for changing the actual velocity of the movement of the magnetic head, thereby adjusting the seek time to be thin the prescribed range. Automatic adjustment may also be achieved by adjusting and controlling the seek time by a control circuit constituted by, for example, a microcomputer. Thus the seek time may be adjusted automatically even in cases wherein the weight of the head arm, the torque of the head arm driving motor or the head position sensor output are fluctuated from one disc drive apparatus to another. By the above described automation of the adjustment process, the number of process steps for seek time adjustment may be reduced for reducing production costs. IN addition, the operational reliability may be improved by dispensing with the volume knob.

We claim:

1. A disc drive apparatus comprising:

at least one disc medium having data surfaces on which a plurality of concentric data tracks and at least first, second, and third concentric reference regions are formed, wherein there is recorded a servo signal in said reference regions;

transducer means for reading a data signal from and writing a data signal to said data tracks and for reading said servo signal from said reference regions;

actuator means for moving and positioning said transducer means above a desired one of said tracks;

position sensing means for sensing a position of said transducer means relative to said disc medium and for outputting plural phases of position signals dephased at least 90° relative to each other;

there being a single reference track in each of said first and second reference regions, wherein both of said reference tracks correspond to a same one of said plural phases of said position signals;

there being plural reference tracks in said third reference region, wherein each of said plural reference tracks corresponds to each of said plural phases of said position signals; and means for correcting said position of said transducer means relative to said disc medium based on a position signal corresponding to said single reference tracks in said first and second reference regions and a first one of said plurality of reference tracks in said third reference region, and on others of said plurality of position signals corresponding to others of said plurality of reference tracks in said third reference region.

2. A disc drive apparatus according to claim 1, wherein:
said first and second reference regions are located respectively in an innermost region and an outermost region of said disc medium; and
said third reference region is located substantially in the middle of said first and second reference regions.

3. A disc drive apparatus according to claim 1, wherein said means for correcting said position of said transducer means further comprises:
first off-track amount detection means for calculating a detection error distribution of said position sensing means along the radius of said disc on the basis of said servo signal from said transducer means obtained by reproducing said reference tracks in said first and second reference regions;
second off-track detection means for detecting reference detection errors of said respective phases of said position signals of said position sensing means on the basis of said servo signals from said transducer means obtained by reproducing said plural reference tracks in said third reference region; and
off-track amount correction means for calculating a detection error distribution of said respective phases of said position signals of said position sensing means along the radius of the disc on the basis of said detection error distribution from said first off-track amount detection means and said reference detection errors of said respective phases from said second off-track amount detection means and for correcting said detection errors of said respective phases of said position signals of said position sensing means,
said actuator means being controlled on the basis of said respective phases of said position detection signals of said position sensing means corrected by said off-track amount correcting means.

4. A disc drive apparatus comprising:
at least one disc medium having data surfaces on which a plurality of concentric data tracks are provided;
transducer means for reading a data signal from and writing a data signal to said data tracks;
actuator means for moving said transducer means over said data tracks;
velocity detecting means for detecting the velocity of the movement of said transducer means;
velocity profile generating means for generating a velocity profile according to the difference between the current position of said transducer means and a target track;
actuator control means for controlling said actuator means according tot he difference between said velocity profile and the current velocity of the movement of said transducer means;
seek time measuring means for measuring a seek time in which said transducer means seeks over a predetermined number of said data tracks; and
gain control means for controlling a detection gain of said velocity detecting means in response to said measured seek time so that said seek time over said predetermined number of said data tracks approaches a predetermined value.

* * * * *